US006957659B1

(12) United States Patent
Sheppard

(10) Patent No.: US 6,957,659 B1
(45) Date of Patent: *Oct. 25, 2005

(54) SLIDING DISK VALVE FOR PNEUMATIC CONVEYANCE OF ABRASIVE MATERIAL

(75) Inventor: C. James Sheppard, Phoenix, AZ (US)

(73) Assignee: Everlasting Valve Company, Inc., South Plainfield, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/937,012

(22) Filed: Sep. 8, 2004

Related U.S. Application Data

(62) Division of application No. 10/157,691, filed on May 29, 2002, now Pat. No. 6,845,783.

(51) Int. Cl.[7] .............................................. F16K 29/00
(52) U.S. Cl. .................. 137/243; 137/243.2; 137/330; 251/63.5; 251/176; 251/327; 451/430
(58) Field of Search ............................ 137/243, 243.2, 137/330, 331; 251/63.5, 162, 167, 176, 195, 251/203, 204, 327, 328; 451/430

(56) References Cited

U.S. PATENT DOCUMENTS 1,091,918 A * 3/1914 Eynon ........................ 137/242
1,836,374 A * 12/1931 Kelly ......................... 137/584
2,964,291 A * 12/1960 Williams et al. ............ 251/327
4,000,584 A * 1/1977 Uyetake et al. ............. 451/430
5,219,148 A * 6/1993 Weyand ...................... 251/175
5,275,374 A * 1/1994 Bauwerker .................. 251/305
5,396,919 A * 3/1995 Wilson ....................... 137/330
6,845,783 B1 * 1/2005 Sheppard .................... 137/243

* cited by examiner

*Primary Examiner*—Kevin Lee
(74) *Attorney, Agent, or Firm*—Richard Esty Peterson

(57) ABSTRACT

A linear actuated disk valve for a fluid conveyance system constructed with a valve body having an internal chamber and a passage through the valve body, the valve body having opposite ends with external connectors that continue the passage and that are connectable to other components in the fluid conveyance system, the improvements being a displaceable cam action closure member in the chamber of the valve body, the closure member having a disk retainer assembly with a disk retainer and at least a pair of circular closure disks engageable with the disk retainer formed by a cam on the retainer and a cam track on the disk being laterally displaced on initial linear displacement of disk retainer with the disk retainer being connected to an actuator shaft with an improved sealing assembly for sealing the shaft at the top of the valve body.

9 Claims, 4 Drawing Sheets

SLIDING DISK VALVE FOR PNEUMATIC CONVEYANCE OF ABRASIVE MATERIAL

RELATED APPLICATION

This application is a divisional application of U.S. application Ser. No. 10/157,691, filed May 29, 2002 now U.S. Pat. No. 6,845,783 issued Jan. 25, 2005.

BACKGROUND OF THE INVENTION

This invention relates to a sliding disk valve. In particular, the sliding disk valve of this invention is designed for an abrasive or erosive environment typically found in pneumatic conveyance of particulate matter or liquid slurries.

In pipeline processing systems where the fluid conveyed causes erosion of the seating surfaces in a valve, certain techniques have been devised to reduce the effects of wear and maintain a seal upon closure.

The displaceable closure member in a slide valve slides against a contact surface within the valve body and typically scrapes the surface to clear material from the seating surfaces. To provide for uniform wear on the seating surface of the closure member, the member includes a contact element in the form of a disk that is mounted to a retainer and free to rotate. This avoids excessive wear of the leading edge of the closure member and distributes wear uniformly around the perimeter contact surface of the disk.

In order to induce the disk to rotate, various mechanisms have been devised including pins within the valve housing that contact the edge of the disk and incrementally rotate the disk on opening the valve, and uniquely configured hubs that incrementally rotate the disk on opening or closing the valve. Rotation of the disk assists in uniform wear on the displaceable closure member, but generally does not greatly improve the wear pattern on the stationary contact surfaces within the valve housing.

The cam-action disk valve of this invention includes a mechanism to generate an oscillating or orbital motion to the disks of the closure member. This orbital motion expands the area of the stationary contact surface that is contacted by the perimeter contact surface of the disks. The greater distribution of wear uniformly over the stationary contact surface prolongs the sealing capability of the valve and therefore extends the service time of the valve before maintenance is required.

The cam-action disk valve of this invention also includes improvements in the design of the seals for the valve stem of the closure member which connects the cam-action disk to an external displacement mechanism. Other features of this improved sliding disk valve are described in greater detail in the Detailed Description of the Preferred Embodiments.

SUMMARY OF THE INVENTION

This invention relates to a linear-actuated disk valve having cam-action disks. The cam-action disks and the seating surface for the disks are self-lapping for distributed wear.

The linear-actuated disk valve of this invention is designed for fluid conveyance where the composition of the fluid results in erosion of the valve closure member and/or the valve seat engaged by the closure member. The valve is a full-open or full-shut valve that operates in a manner similar to a gate valve. However, unlike the typical gate valve, the closure member of the disk valve of this invention includes a pair of contact disks that have an orbital motion during opening and closure of the valve. The orbital motion results from a cam-actuated oscillation of the disks during each opening or closure of the valve. The disks are carried on a retainer unit within the body of the valve. The retainer unit is connected to a valve stem in the form of a drive shaft that extends through a seal in the valve body. The drive shaft is actuated by an actuator mechanism connected to the end of the drive shaft. The actuator mechanism may be mechanical, electronic, hydraulic, or pneumatic.

Frequently, fluid conveyance systems carry a material that is abrasive. The linear-actuated disk valve is therefore suitable for liquid slurry systems, dry-particle pneumatic systems and other systems where the conveyed fluid may cause ablation of the sealing components of the valve.

The advantage of a modern disk valve is that the closure member includes one and generally two disks which reorient with relation to the disk seating surface during opening and/or closure. Conventionally, the disks are carried on a disk retainer unit and free to incrementally rotate relative to the mount unit to distribute wear around a perimeter contact surface on each disk. The contact surfaces of the disks slide over complimentary contact surfaces in the valve housing that form valve seats around the internal passage through the valve. In this manner, the sliding action of the contact surfaces of the closure member over the contact surfaces of the valve seat scrape material from the contact surfaces and ensure a uniform seating of the closure member to seal the passageway through the valve.

The cam-action oscillation of the disks in the improved disk valve of this invention results in a self-lapping of the contact surfaces and an improved wear profile. The cam-action disks distribute wear over a greater area of the contact surfaces of the valve seat. In this manner the operational life of the valve before servicing is extended.

In a embodiment described in the Detailed Description of the Preferred Embodiment, the cam-action disk valve is adapted for use in a pneumatic conveying system and utilizes a pneumatic actuation mechanism to linearly displace the closure member. As noted, any of a variety of actuating devices can be utilized to linearly actuate the opening and closing of the valve when desired. In a pneumatic control system, 80–120 psig instrument air is used to actuate the pneumatic actuator for controlling operation of the valve.

Additionally, the pressurized gas (or other fluid) supplied to control the valve can be employed for improved operation and maintenance of the valve by strategic blow of control fluid into body of the valve for cleaning or improved sealing.

DETAILED DESCRIPTION OF THE PREFERRED EMBODIMENTS

Figure 1:
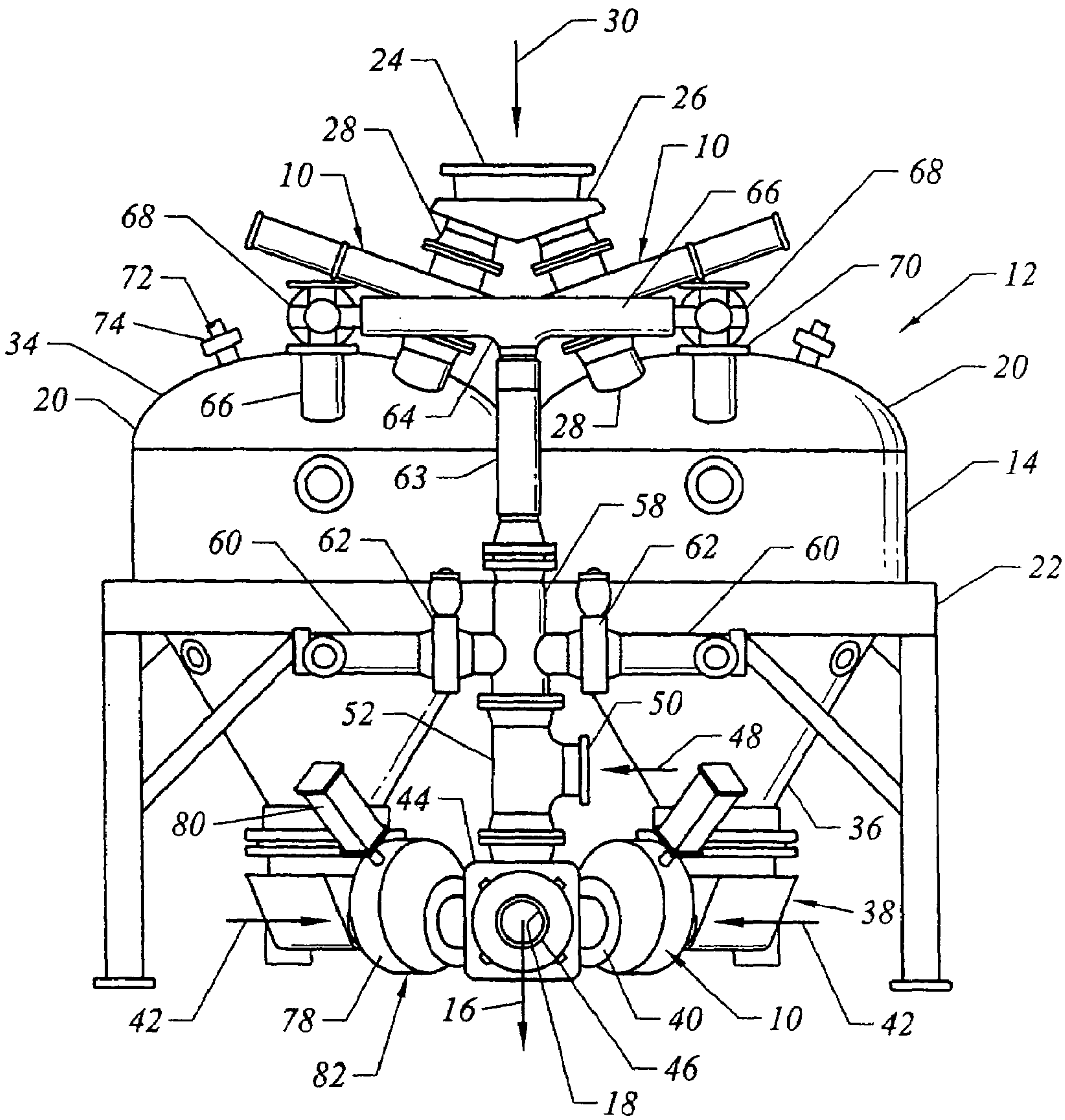
FIG. 1 is a front elevational view of the invented cam-action disk valve in a tandem pod conveyor system.

Referring to FIG. 1, the cam-action disk valves of this invention, designated by the reference numeral 10, are schematically shown in a typical installation 12. The installation is in the form of a tandem pod conveyor system 14 for continuously supplying dry particle material from a bulk feed to a pneumatic conveyance pipe line 16 as shown schematically in FIG. 1. It is to be understood that the invented disk valves are utilized in any system where conventional disk valves are deployed for opening and closing a passageway through which an erosive fluid passes. For example, in a pneumatic system conveying hot fly ash, a harsh and abrasive material is suspended in an air stream and transported at high velocity through a conveyance line. An on-off valve can abruptly interfere with the medium flow resulting in erosion of the internal components of the valve. Typically, a displaceable closure member is moved over a passageway onto a seating surface to seal the passageway. To open the passageway, the closure member is retracted. The lip of the closure member and rim of the seating surface erode resulting in loss of a seal.

In the typical installation 12 of FIG. 1, multiple disk valves 10 are used to regulate the continuous supply of dry particle matter to the input end of a transport conduit 18 for conveyance of the particle matter in a fluid stream in the pipe line 16 to a displaced location. In the pipe line 16, other similar cam-action disk valves are used in equipment or fittings to direct material flow through a desired conveyance circuit.

The tandem pod system 14 includes two pressurizable pods 20 supported in a framework 22. The pods 20 are supplied with dry particle material through a supply port 24 on a bulk supply manifold 26 servicing both pods 20. The supply manifold 26 bifurcates and connects to two separate feed conduits 28 each having a linear-actuated disk valve 10 interposed on the feed line 30, shown schematically, before the feed conduits 28 connect to the top 32 of the respective pods 20. Each pod 20 in the tandem pod system 14 is equipped as a mirror-image to the other pod 20 and positioned side-by-side. The pods 20 have a conical bottom 36 that connects to a discharge assembly 38 with a discharge conduit 40. A cam-action disk valve 10 is interposed in the discharge line 42, shown schematically, before the discharge conduit 40 connects to a common mixing box 44 having a discharge port 46 that connects to the input end of the transport conduit 18.

Also connected to the mixing box 44 is a pressurized air supply line 48, shown schematically, connected to a pressurized air supply (not shown). Air from the air supply line 48 enters the side port 50 of a tee 52 having one end connected to the mixing box 44 and an opposite end connected to an air supply circuit 58 for the two pods 20. The air supply circuit 58 has two branch conduits 60 connected to the sides of the pods 20. Each branch conduit 60 has a butterfly control valve 62 for admitting and regulating pressurized air flow to the pods 20 for agitating the dry particle matter contained within the pod 20. The air supply circuit 58 also has a common supply conduit 63 leading to a central distribution tee 64. The central distribution tee 64 has branch conduits 66, each having an interposed butterfly valve 68 and an end tee 70 before the branch conduit 66 connects to the top 34 of each pod 20. Each pod 20 has a vent 72 with a vent valve 74 for venting the pod during the refill process.

In operation, one or both pods 20 can be supplying the dry particulate matter in an air flow to the transport conduit 18 under pressure from the air supply circuit 58. The tandem pod system 12 is designed for substantially continuous operation enabling one pod to be filled while the other pod continues to discharge its material into the transport conduit 18. During the refill operation for one of the pods 20, the butterfly valves 62 and 68, controlling the air supply for the top and bottom of that pod, are closed and the disk valve at the bottom of the pod, which is normally open when discharging material, is closed. The disk valve 10 at the top of the pod 20, which is normally closed, is open allowing feed of material from a bulk supply into the isolated pod. The vent 72 is also open during the refilling process to accommodate air displacement as the pod fills. Once the pod is filled, the vent 72 and disk valve 10 for the feed supply are closed and the butterfly valve 62 for agitating the material and pressurizing the vessel is opened seconds before simultaneously opening the butterfly valve 68 and the disk valve 10 for the discharge, which then releases the material into the flow system. In general, the air pressure ranges from 10 psi to 50 psi depending on the resistance in the conveyance pipe line 16 for delivering the material being conveyed to its destination. It is to be understood that the tandem pod system 10 of FIG. 1 is for purposes of illustration and is not intended to limit the application of the cam-action disk valve 10 of this invention.

Figure 4:
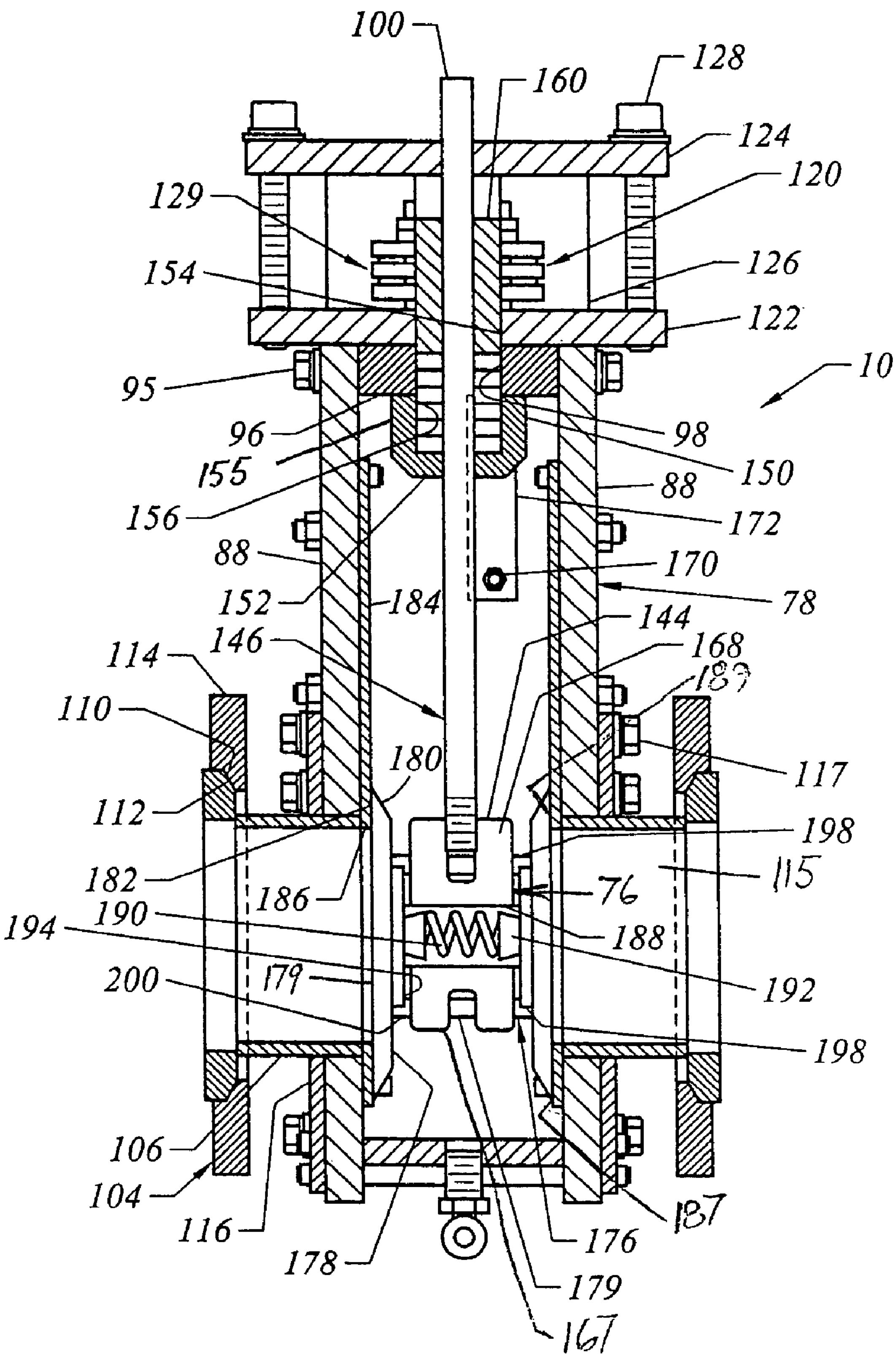
FIG. 4 is a cross-sectional view of the cam-action disk valve of this invention without an actuator component.

In the preferred embodiment of the cam-action disk valve 10 in FIG. 4, the linear-activated valve has a displaceable closure member 146 connectable to any type of linear actuator mechanism of conventional or custom design. In the embodiment shown, the cam-action disk valve 10 has a valve component 78 coupled to an actuator component 80 to form a disk valve unit 82. The cam-action disk valve 10 may have other configurations depending on the type of drive mechanism included as the actuator component 80 for the valve unit 82 of a particular application.

Figure 2:
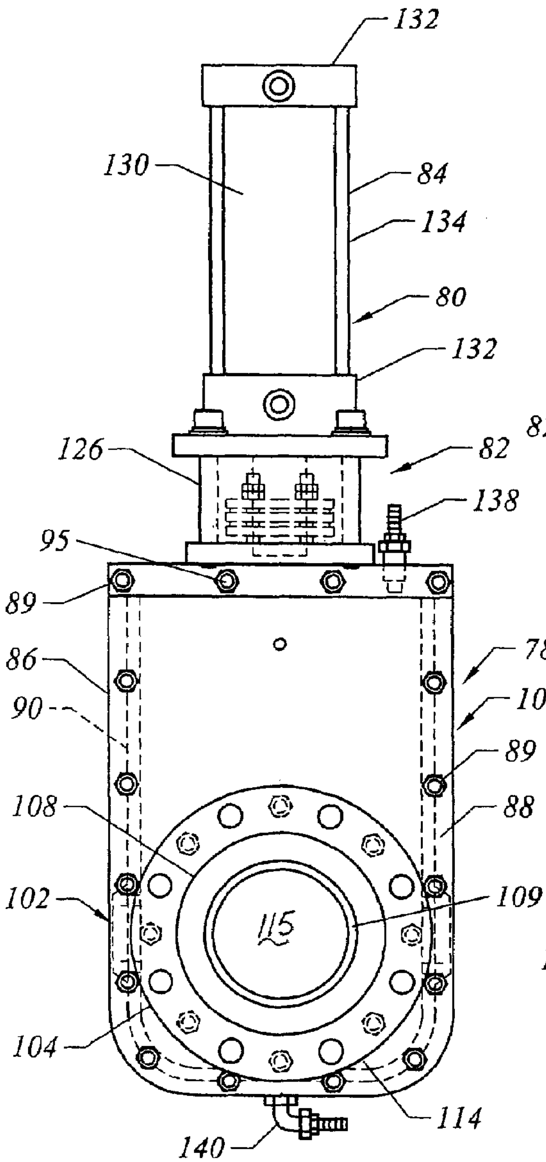
FIG. 2 is an end elevational view of the cam-action disk valve with an actuator component in the form of a pneumatic piston drive.
Figure 3:
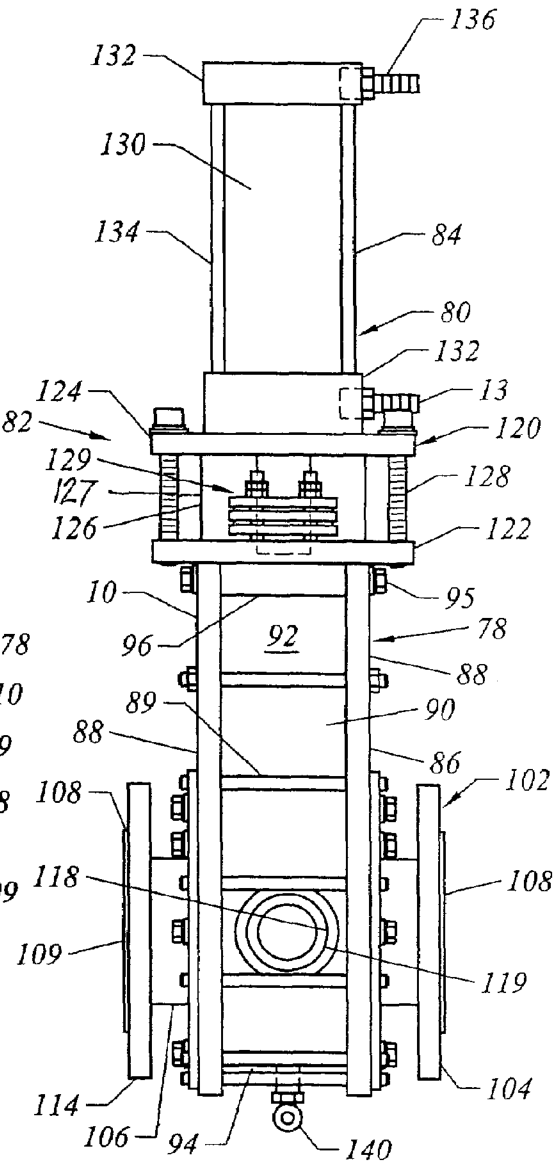
FIG. 3 is a side elevational view of the cam-action disk valve of FIG. 2.

Referring to FIGS. 2 and 3, the cam-action disk valve 10 has the valve component 78 coupled to an actuator component 80 in the form of a pneumatic piston drive 84. The valve component 78 has a valve body 86 constructed with end plates 88 joined by clamping bolts 89 to a U-shaped body member 90 forming the sides 92 and bottom 94 of the valve body 86 with bolts 95 threadably engaging a top plate 96, thereby providing an enclosure for the internal components. The top plate 96 has a bore 98 through which a cylindrical drive shaft 100 projects, as shown in FIG. 4.

On opposite ends of the valve body 86 are connectors 102 in the form of flange assemblies 104. Each flange assembly 104 includes a tubular neck 106 with an annular coupling ring 108 fixed to the neck 106. The coupling ring 108 has a sealing face 109 and a chamfered shoulder 110 that contacts a complimentary chamfered lip 112 on a slip-ring, bolting flange 114, as shown in FIG. 4. The slip-ring bolting flange 114 permits the cam-action disk valve to be connected to processing equipment and fittings with minor misalignment of the flanges to which the valve is bolted.

As shown in greater detail in the cross-sectional view of the valve component 78 in FIG. 4, the flange assembly 104 includes a collar 116 fixed to the tubular neck 106 for securing the flange assembly to the end plates 88 by bolts 117. The connectors 102 continue a passage 115 through the valve body 86, which is selectively blocked or opened during operation of the valve. This construction and arrangement of the flange members allow flexibility in sizing the profile of a valve body 86 shown in FIG. 3 for a particular installation fitting. As shown in FIG. 3, the valve body 86 has an inspection and access port 118 with a plug 119 that is in place during operation.

Secured in part to the topside of the top plate 96 of the valve body 86 is a shaft seal assembly 120. The shaft seal assembly 120 has a base plate 122 and an adjustable seating plate 124 separated from the base plate 122 by a pair of compressible spacer 126. The compressible spacer 126 is formed with three spacer segments 127 to permit the alignment and spacing between the seating plate 124 and the base plate 122 to be adjusted by four corner adjustment bolts 128. The compressible spacer 126 encompases a packing unit 129, shown in part in FIG. 3. The seating plate 124 provides a mounting surface for the actuator component 80, which in FIGS. 2 and 3 comprises the pneumatic piston drive 84.

The piston drive 84 in FIGS. 2 and 3, includes a cylinder 130 and end caps 132 coupled to the cylinder by interconnecting threaded rods 134. Contained within the cylinder 130 is a displaceable piston (not shown) that is connected to the end 136 of the drive shaft 100. The end caps 132 for the cylinder 130 include air supply nipples 136 for selectively driving the piston from one end of the cylinder to the other by air pressure. The piston may include a tracking indicator of a magnetic composition such that the piston position can be tracked to determine the open or closed state of the valve.

Other air supply nipples 138 and 140 installed on the valve body 86 are employed to blow air into the enclosure of the valve body in the event that conveyed material becomes packed in the enclosure and interferes with the operation of the valve. Additionally, the air nipples 138 and 140 can be used to supply pressurized air to the enclosure formed by the valve body 86 to assist in the applied sealing force.

Referring again to the cross-sectional view of FIG. 4, the valve component 78 is shown without the actuator component 80 of FIGS. 2 and 3 for purposes of illustrating the internal components of the cam-action disk valve, including the novel disk arrangement featured in this invention.

The drive shaft 100 is shown projecting above the seating plate 124. As noted, other linear-actuator mechanisms can be connected to the end 142 of the drive shaft 100 for opening and closing the valve by displacement of the drive shaft. The drive shaft 100 passes through the shaft seal assembly 120 to connect to a disk retainer assembly 144. The combined drive shaft 100 and disk retainer assembly 144 form the closure member 146 for the valve component 78. The shaft seal assembly 120 prevents fluid and material in the cavity 148 formed by the valve body 86 from escaping into the environment.

Figure 5:
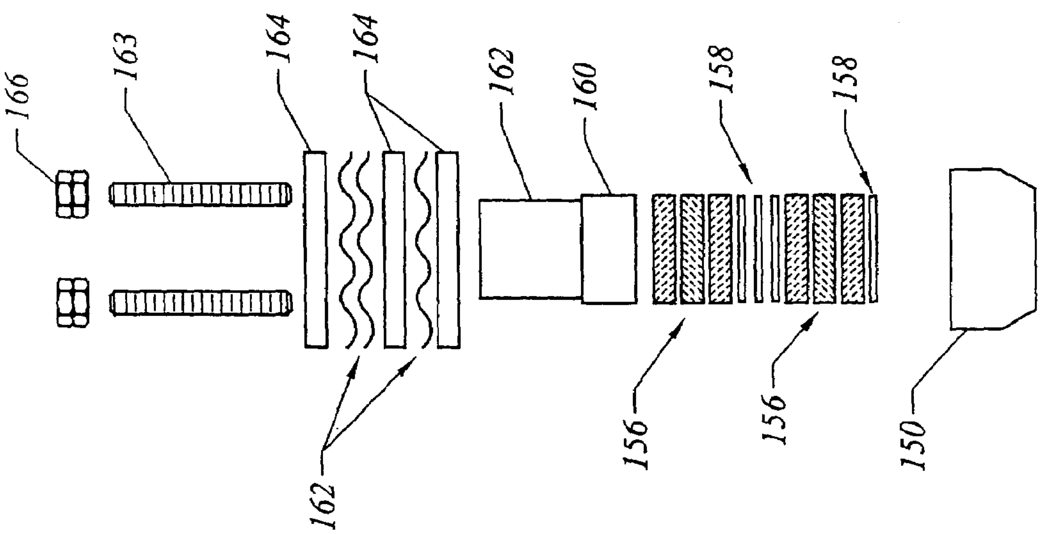
FIG. 5 is an exploded view of a shaft seal assembly for the cam-action disk valve of this invention.

Welded to the underside of the top plate 96 of the valve body 86 is a socket 150 with a shaft hole 152. The socket 150, together with the bore 98 in the top plate and a bore 154 in the base plate 122, form a well structure 155 that contains a series of flat packing rings 156. As shown in the exploded view of FIG. 5, the packing rings 156 are provided in two sets of three packing rings 156 separated by a series of wave spring washers 158 and capped by a packing bushing 160. The packing bushing 160 has a shoulder 162 on which are supported a series of three compression collars 164 separated by wave spring washers 162. The stack is held in place by four threaded pins 163 that pass through holes (not visible) in the compression collars 164 to thread into the base plate 122 and top plate 96, and connect to adjustment nuts 166. This arrangement allows a sufficient compression to be applied to the packing rings 156 to seal the cavity 148 during reciprocation of the drive shaft 100 without seizing the shaft or overly restricting its displacement.

The drive shaft 100 is connected to a disk retainer 167 in the form of a clevis 168. The clevis 168 is generally block-like in configuration and when the closure member 146 is retracted during opening of the valve, a pair of oppositely positioned adjustment bolts 170 on tabs 172 (one shown) depending from the top plate 96 of the valve body 86 contact each side of the clevis and maintain alignment. Where the actuator mechanism has means for maintaining the alignment of the drive shaft 100, this alignment component within the valve body 86 may be unneeded and eliminated.

The clevis 168 has a cam 174 with four spaced parallel pins 176 that limit the movement of a pair of opposite circular closure disks 178 of the disk retainer assembly 144 during reciprocal displacements of the closure member 146. The clevis 168 has central shoulder notches 179 to permit access to the pins 176 to weld and fix the pins to the clevis 168.

Each closure disk 178 has a face 179 with a perimeter rim 180 having a contact or seating surface 182 that slides over a hardened wear plate 184 in the valve body 86. The wear plate 184 and valve body 86 have a circular opening 186 in alignment with the concentric flange assemblies 104 to provide a through passage when the disks 178 are retracted by the drive shaft 100 to an open position. Around the opening is a lip 187 with a contact surface or seating surface 189 that co-operates with the seating surface 182 of the rim 180 of the disk 178 to seal the passage 115 through the valve when the disk 178 is positioned over the opening 186 of the valve disk body 86 and wear plate 184.

The clevis 168 has a cross bore 188 in which is retained a compression spring 190 having projecting load transfer buttons 192 at each end. The load transfer buttons 192 ride on an inner circular recess 194 in a circular mounting dome 196 located on the backside of the sliding closure disks 178. The spring constant for a selected spring determines the force of closure attributed to the spring.

Figure 6C:
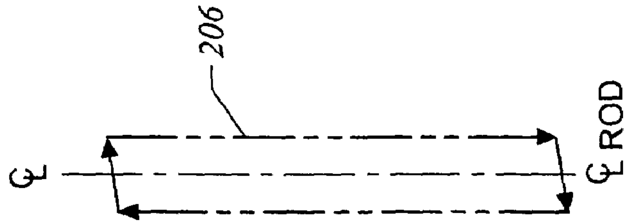
FIG. 6C is a diagramatic illustration of the path of travel of the disk of the cam-action disk valve during a cycle of operation.
Figure 6A:
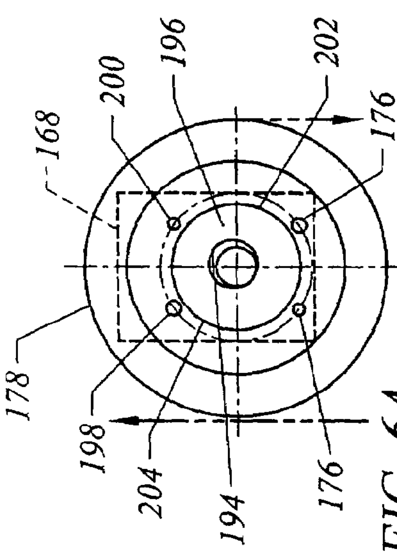
FIG. 6A is a schematic view of a part of the cam-action disk retainer assembly for the cam-action disk valve during opening.
Figure 6B:
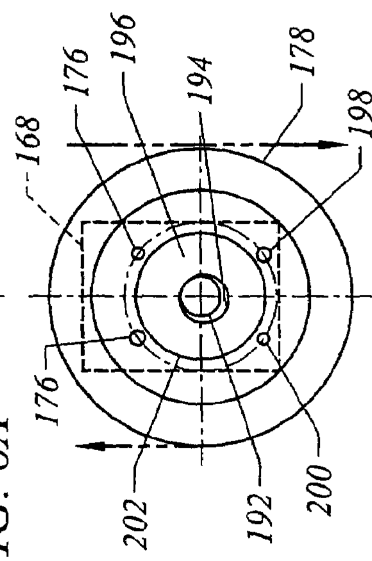
FIG. 6B is a schematic view of a part of the cam-action disk retainer assembly for the cam-action disk valve during closing.

As illustrated in FIGS. 6A and 6B, two of the diagonally opposite pins 176 projecting through the clevis 168, shown in phantom, are cam pins 198 and have a diameter slightly larger than the other two retainer pins 200. The disk mounting dome 196 on each slide disk 178 has a circular raised hub 202 concentric with the disk that is engageable by the sides of the pins 176 of the cam 174 in a manner that causes an oscillatory motion to the disk 178 during operation. The circular recess 194 is located in and concentric with the raised hub 202. The centerline of the pins 176 are positioned on a common radius from a centerpoint for the cross bore 188 such that there is an incremental space or tolerance between the sides of the pins and the outer circular contact or cam tracking surface 204 around the side of the hub 202.

As shown in the partly schematic illustrations of FIGS. 6A, 6B and 6C, the orbital or oscillating motion of the disk is achieved by initial contact of the larger-diameter cam pin 198 on the tracking surface 204 of the hub 202 during initiation of the downward movement as shown in FIG. 6A, or, during initiation of the upward movement as depicted in FIG. 6B. During initial linear displacement of the disk retainer 167, the cam pin 198 first contacts the hub 202 and kicks the sliding disk 178 laterally to one side as limited by the retainer pin 200. Although the cyclic sequence is exaggerated in FIG. 6C, the initial path of the disk center on opening and closing the valve is shown as a lateral side-to-side motion path 206 relative to the linear motion path of the disk retainer 167.

As shown in FIGS. 6A and 6B, the recess or well 194 in the hub 202 on the mounting dome 196 of the disk 178 has a sufficiently large diameter to accommodate the contact buttons 192 of the compression spring 190 as the disk 178 shifts in position. The cam-action imparted to the disks by the cam pins 198 as limited by the retainer pins 200 results in an orbital lapping of the seating surface 189 of the wear plate 184 by the seating surface 182 of the disk 178. The continually shifting of the disk distributes wear around the contact surface 182 of the disk and over an extended contact surface 189 of the wear plate 184 resulting in longer wear and improved sealing of each closure disk 178 when seated over the opening 186 in the wear plate 184. In this manner, the seating surfaces around the openings 186 of the wear plates 184 and the contact surfaces 189 of the closure disks are mutually ground or burnished to prevent localized wear or erosion of the components. As noted, when the disks 178 are seated over the opening 186 in the wear plates 184, the force of seating imparted by the spring 190 can be enhanced by pressurizing the cavity 148 through one or both of the nipples 138 and 140.

What is claimed is:

1. In a linear actuated disk valve for a fluid conveyance system wherein the disk valve has a valve body with an internal chamber and a passage through the valve body, the valve body having opposite ends with external connectors that continue the passage and that are connectable to other components in the fluid conveyance system, a displaceable closure member having a disk retainer assembly with a disk retainer and at least one circular closure disk engageable with the disk retainer, wherein the valve body includes an internal circular lip having a seating surface around the passage, and the disk has a perimeter rim with a seating surface contactable with the seating surface of the lip to seal the passage, the disk being laterally displaced on linear displacement of the disk retainer, wherein the retainer assembly has a connector member constructed to connect with a reciprocal linear displacement actuator that linearly displaces the disk form a closed position with the disk located over the lip of the opening in the valve body and an open position with the disk displaced from the opening in the valve body that opens the passage, and wherein the valve body has a top with a bore and the connector member includes a cylindrical drive shaft that projects through the bore, wherein the improvement comprises:

a shaft sealing assembly mounted on the valve body around the cylindrical drive shaft, wherein the top of the valve body has a well structure with a series of stacked packing rings contained by the well structure, and a packing bushing with a collar having a series of adjustment screws spaced uniformly around the collar connecting the collar to the top of the valve body, wherein the adjustment screws adjust the pressure of the packing bushing against the stack of packing rings; and, a seating structure for a linear actuator mechanism, the seating structure being located above the shaft sealing assembly and having a spacer seated on the top of the valve body for supporting the seating structure, the seating structure having adjustment screws for securing the seating structure to the top of the valve body.

2. The shaft sealing assembly in the linear actuated disk valve of claim 1 wherein the series of stacked packing rings has sets of multiple contiguous packing rings separated by spring washers.

3. The shaft sealing assembly in the linear actuated disk valve of claim 2 wherein two sets of three packing rings are separated by multiple wave spring washers.

4. The shaft sealing assembly in the linear actuated disk valve of claim 3 wherein the packing bushing includes at least one additional collar with the collars separated by at least one spring washer.

5. The shaft sealing assembly in the linear actuated disk valve of claim 1 wherein the spacer is compressible and comprised of multiple spacer segments.

6. The shaft sealing assembly of claim 5 wherein the valve body has a guide in the internal chamber and the displaceable closure member has guide surface contactable by the guide, wherein the radial alignment of the displaceable closure member is maintained on displacement of the closure member by the reciprocal linear displacement actuator.

7. The shaft sealing assembly of claim 1 wherein the engagement of the disk with the retainer is formed by a cam structure on the retainer and a cam tracking surface on the disk, the disk being laterally displaced on initial linear displacement of the disk retainer and engagement of the cam structure on the retainer with the cam tracking surface on the disk.

8. The shaft sealing assembly of claim 7 wherein the disk retainer assembly of the displaceable closure member has an additional circular closure disk having a cam tracking surface engageable with the cam structure on the retainer, and wherein the internal circular opening of the valve body has opposed seating surfaces around the passage wherein the two closure disks engage the retainer by the cam structure and are displaceable over the seating surfaces in unison by the linear displacement actuator.

9. The shaft sealing assembly of claim 8 wherein the retainer has a bore with a spring and a pair of oppositely directed contact buttons, each disk having a backside with a button receiving recess, the buttons engaging the circular closure disks in the recess at the backside of the disks.

* * * * *